S. V. TENCH.
CHAIN.
APPLICATION FILED NOV. 19, 1919.
1,377,371.
Patented May 10, 1921.
2 SHEETS—SHEET 1.
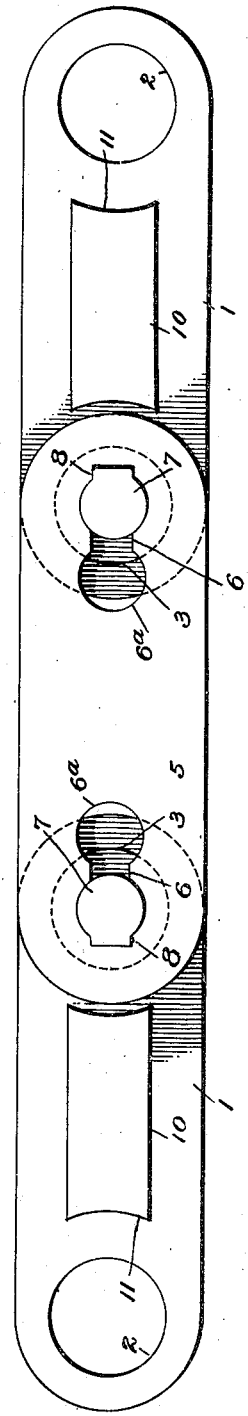
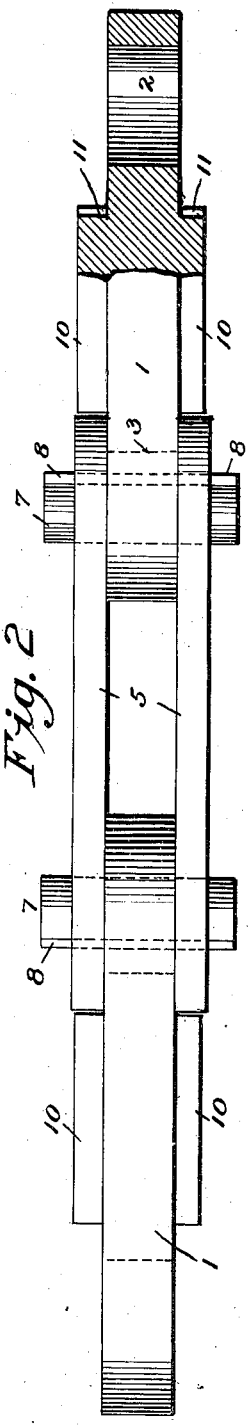
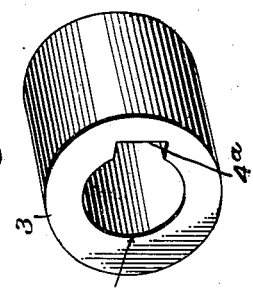
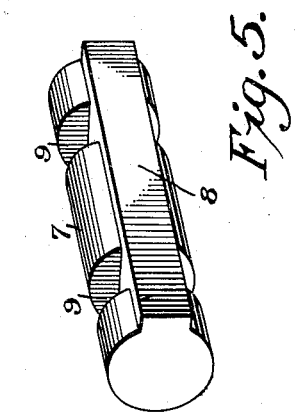
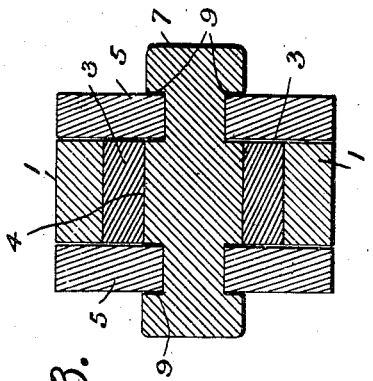
INVENTOR
Samuel V. Tench
BY
Ralph S. Warfield
ATTORNEY S. V. TENCH.
CHAIN.
APPLICATION FILED NOV. 19, 1919.
1,377,371.
Patented May 10, 1921.
2 SHEETS—SHEET 2.
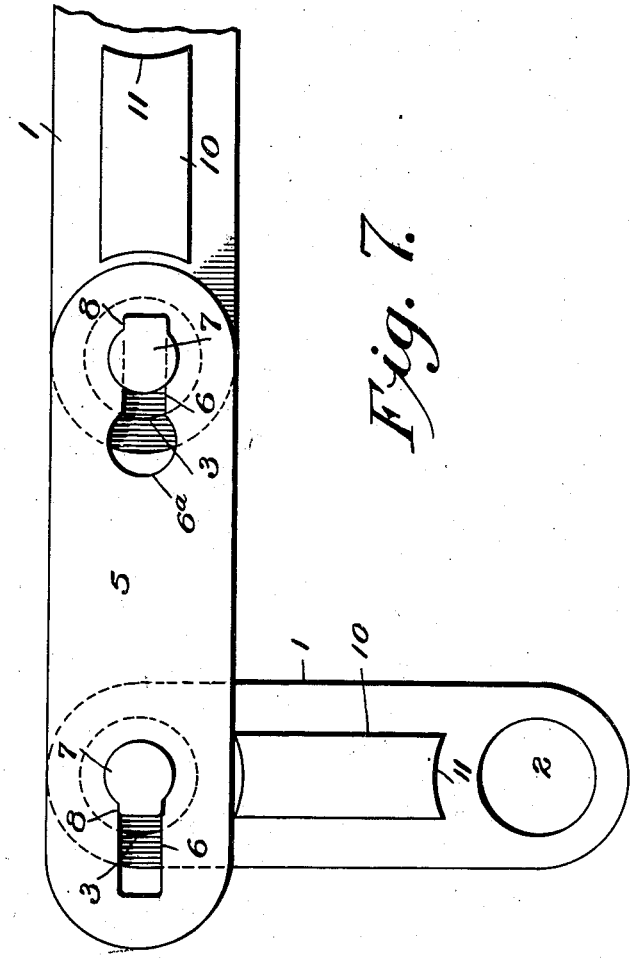
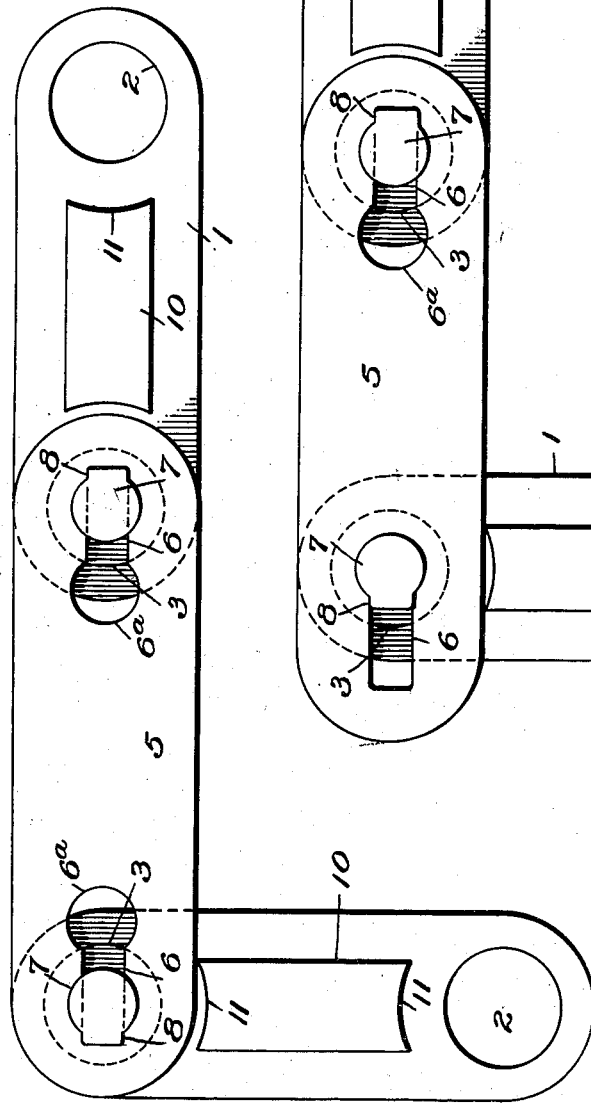
INVENTOR
Samuel V. Tench
BY
Ralph S. Warfield.
ATTORNEY

UNITED STATES PATENT OFFICE.

SAMUEL V. TENCH, OF WILKES-BARRE, PENNSYLVANIA.

CHAIN.

1,377,371. Specification of Letters Patent. Patented May 10, 1921.

Application filed November 19, 1919. Serial No. 339,030.

*To all whom it may concern:*

Be it known that I, SAMUEL V. TENCH, a citizen of the United States, residing in Wilkes-Barre, Luzerne county, Pennsylvania, have invented new and useful Improvements in Chains, of which the following is a specification.

The conditions under which drive chains employed around coal mines, are required to operate, render the usual form of chain unsuitable.

In the first place, the sulfur impregnated water incident to coal mining, rapidly corrodes all metal with which it contacts, and especially where any wear takes place, as between the couplings of a chain, thereby necessitating frequent repairs and replacements.

Because of the rapid deterioration and wear, it is necessary to inspect and repair chains used in elevating, conveying, car hauls, or the like, at very frequent intervals. Furthermore, even in view of the most careful inspection and repair practicable, the chains occasionally break, and the speed with which the broken parts may be replaced and the chain reassembled determines the length of time during which that particular part of the plant depending upon the operation of the chain, remains idle.

Thus, for example, in case a chain used for elevating coal should break, both lengths or courses of the chain fall to the bottom of the boot in a heap. It is then necessary to untangle the two sides or courses of the chain, loosen the adjustment to permit the sprockets to approach each other more closely, lift one course of the chain to, and fit it around the upper sprocket, remove the broken parts and replace them with new ones, and readjust the sprockets to take up the slack.

Obviously, if the chain is so constructed that the individual links separate from their adjacent links when a breakage occurs, the task of reassembling the links to reform the chain, is added to the work of substituting new parts for those which have broken.

On the other hand, the chain must be so constructed as to permit the easy and rapid removal of worn or broken parts and the substitution of new ones, in order to reduce delays in operation, to a minimum.

One object of this invention is to provide a chain having a minimum of working parts, thereby reducing the wear and consequently the amount of repairs and substitutions necessary to maintain the chain in good condition.

Another object is to provide a chain wherein such wear as takes place, is confined to a single part in each coupling between two links, which part is easily and quickly removed and replaced.

Still another object is to provide a strong chain readily assembled and disassembled, and wherein the liability of its accidental disconnection is almost negligible.

To these and other ends, my invention includes certain novel features and combinations of parts, all of which will be more fully set forth hereinafter and particularly pointed out in the claims.

In the accompanying drawings, Figure 1 is a side view of a few connected links of a chain constructed in accordance with one embodiment of my invention;

Fig. 2 is a plan view, partly in section;

Fig. 3 is a transverse cross-sectional view, showing one of the couplings;

Fig. 4 is a perspective detail view of the removable and rotatable bushing;

Fig. 5 is a similar view of the key or coupling.

Fig. 6 is a side view, showing one of the links swung to a position at right angles to the remaining links, preparatory to disconnecting the chain, for instance, and Fig. 7 is a similar view, showing the depending link of Fig. 6 shifted relatively to the adjacent link, to register the coupling 7 with the enlargements 6$^a$ of the slots 6 in the sectional link just prior to thrusting the coupling endwise, in coupling or uncoupling the chain at that point.

In the particular form selected for illustration, I have shown a chain composed of alternate solid and sectional links, the ends of the side members of the sectional links adapted to embrace the ends of the solid links, but other arrangements might be resorted to within the scope of my invention.

The solid links 1 are each provided near their opposite ends with circular eyes 2 extending transversely therethrough.

A cylindrical bushing 3 is rotatably and removably fitted in each eye, the bushings each having an opening 4 therethrough from end to end; in this case, of circular contour with a communicating keyway 4$^a$ (Fig. 4) coextensive in length therewith, so that the polygonal opening takes the form of a keyhole slot.

The sectional links each include a pair of parallel side members 5, 5, the ends of which accommodate between them the adjacent end of the solid link 1.

Slots 6 (Fig. 1) are formed in the opposite ends of each side member 5, the slots extending longitudinally of the side members and being enlarged at their inner ends as at 6ª. The slots 6, 6ª are longer than the polygonal openings 4, 4ª in the bushings 3.

To assemble the links to form a chain, the end of a solid link 1, bearing a bushing 3 seated in its eye 2, is held at right angles to and inserted between the ends of the side members 5, 5 forming a sectional link, with the opening 4 of the bushing in register with the enlarged ends 6ª of the slots in the parallel side members, and the keyway 4ª of the bushing also registering with the slots 6 of the side members 5, 5.

The links are then coupled together by a cylindrical key or pintle 7 which is inserted endwise through the registered enlargements 6ª, 6ª in the side members 5, and the opening 4 in the bushing 3, the key or coupling having a spline 8 extending longitudinally thereof and preferably coextensive in length therewith. The spline 8 passes through the slots 6, 6 and fits the keyway 4ª to prevent rotation of the bushing 3 on the key 7, and also to prevent rotation of the key 7 relatively to the side members 5 of the sectional link.

The key 7 is provided, near its opposite ends, with diametrically opposed, transversely extending parallel grooves 9, whereby to enable the key or pintle to slide along the slots 6 toward members adjacent the outer ends thereof, the side walls of the slots fitting in the transverse grooves 9, as shown in Fig. 3, to lock the coupling 7 against endwise displacement.

The opening 4 of the bushing preferably coincides in diameter with the enlarged ends 6ª of the slots 6 in the side members 5, and, with the keyway 4ª, affords a sliding fit for the pintle 7.

The solid link 1, while still held at approximate right angles to the sectional link, is then shifted together with the key 7, toward the outer ends of the slots 6 until the outer face of the spline 8 on the key, contacts the end walls of the slots, after which the link 1 is swung into alinement with the sectional link, to form the chain, the solid link turning on its bushing 3.

It will be observed that, in use, the wear between the parts, as the links pass around their sprockets, is confined to the exterior peripheries of the bushings 3, there being relative turning movement between the bushings and the eyes 2 of the solid links, the bushings, keys and sectional links remaining stationary relatively to each other.

Hence, it is only necessary, in making ordinary repairs due to wear, to replace the bushings which may be conveniently made of a suitable metal as bronze, brass, or the like.

To prevent the accidental telescoping or collapse of the links relatively to one another in the event of breakage or slackening of the tension on the chain, I preferably provide the opposite sides of each solid link 1 with a laterally projecting abutment or stop 10 which lies in alinement with the side members 5, and extends to a point adjacent each eye 2, the outer ends of the abutments being recessed or concaved, as at 11 (Fig. 1) to conform to the convex ends of the side members 5, when the links are arranged in alinement with each other.

When the chain is under tension, the concave ends of the abutments 10 lie slightly apart from the adjacent convex ends of the sectional links, such clearance being necessary to permit the corners of the abutments to pass or travel along the longitudinal edges of the sectional links 5 when connecting and disconnecting the links, as shown in Figs. 6 and 7.

When the links are in normal position, the abutments or stops 10, by their contact with the ends of the side members 5, prevent the links from shifting endwise, and thus prevent the accidental return of the pintles or keys 7 from the outer reduced portions of the slots 6 to the inner enlarged portions 6ª thereof.

The concave recessed ends of the abutments are of sufficient extent to afford broad contact faces against which the convex ends of the side members 5 of the sectional links abut at any angle which the links may assume when in use. The abutments 10 materially strengthen the links 1.

In case of breakage, the two courses or lengths of chain will fall to the bottom of the boot or other inclosure, but the liability of the links to become accidentally disassembled is reduced to a minimum by the provision of the abutments 10, which will not permit the disconnection of the links unless the one link is brought to approximate right angles to its adjacent link, as shown in Fig. 6, and then shifted with the key 7, to slide the latter from the reduced portions of the slots 6 to the enlarged portions 6ª, as shown in Fig. 7, after which, and while maintaining the links in such right-angular relation, it is necessary to press the key endwise transversely of the chain before the links can be disconnected.

The sprocket teeth fit in the space formed between the side members 5, 5 and the opposing ends of the alternate solid links 1, 1.

By the use of the bushings 3, I prevent wear on the pintles or keys 7, which may be used repeatedly.

Changes may be made in the form and arrangement of the several parts set forth, without departing from the spirit and scope of my invention.

What I claim as new, is—

1. The combination in a sprocket chain comprising alternate one-piece links, and sectional links formed of side members, the one-piece links each having a circular eye; of a bushing rotatably and removably fitted in the eye of the one-piece link, and having a polygonal opening therethrough; the adjacent ends of the members forming the next sectional link adapted to embrace the end of the one-piece link, and having registering slots formed therethrough similar in shape to the opening in the bushing which is adapted to register therewith, but of greater extent in one direction; and a key or coupling insertible through the polygonal slots, and through the polygonal opening in the bushing, the cross-sectional contour of the key being adapted to fit the polygonal opening in the bushing, to prevent relative rotation between the key and the bushing, relative rotation being permitted between the outer periphery of the bushing and the eye of the one-piece link.

2. In a chain, the combination of a link having a circular eye at one end; a bushing rotatably and removably fitted in the eye; the bushing having a polygonal opening therethrough; a sectional link including a pair of side members, the ends of which are adapted to embrace the end of the first-named link, the ends of the side members being slotted, one end of each slot being enlarged; and a key having a longitudinally-extending spline, insertible through the enlarged portions of the slots and through the polygonal opening in the bushing, the key provided near its ends with diametrically opposed, transversely extending grooves, and slidable into the reduced portions of the slots, the walls of which side members adjacent the reduced portions of the slots are adapted to enter the transverse grooves to lock the key against endwise displacement.

3. In a chain, the combination of a link having a circular eye near one end; a bushing rotatably and removably seated in the eye, and having a polygonal opening therethrough; a sectional link, including side members adapted to embrace the end of the first-named link, the side members being slotted; and a key insertible through the slots in the side members, and through the polygonal opening in the bushing, the key having a spline extending longitudinally thereof, which with the key, fits the polygonal opening in the bushing, and prevents rotation of the latter relatively to the key.

4. In a chain, the combination of a link having a circular eye formed in one end thereof; a bushing rotatably and removably seated in the eye, and having an opening formed therethrough, one end of the opening being enlarged; a sectional link, including side members adapted to embrace the end of the first-named link, each side member having a slot formed therein, of greater length than the opening in the bushing, and enlarged at one end; the enlarged ends of the slots adapted to register with enlarged end of the opening in the bushing when the links are arranged at approximate right angles to one another; a key insertible through the enlarged ends of the slots and the opening in the bushing, and a spline on the key adapted to be accommodated in the remaining portion of the opening in the bushing, to prevent relative rotation of the bushing and key, the key provided, near its opposite ends, with opposed, transversely extending grooves to enable the key to slide into the reduced portions of the slots in the side members, the walls of which side members adjacent said reduced portions of the slots fit in the transverse grooves to lock the key against endwise displacement.

5. The combination in a sprocket-chain comprising alternate one-piece links, and sectional links formed of side members, the one-piece links each having a circular eye; of a bushing rotatably and removably fitted in the eye of the one-piece link, and having a polygonal opening therethrough; the adjacent ends of the members forming the next sectional link adapted to embrace the end of the one-piece link, and having registering slots formed therethrough similar in shape to the opening in the bushing which is adapted to register therewith, but of greater extent in one direction; and a key or coupling insertible through the polygonal slots, and through the polygonal opening in the bushing, the cross-sectional contour of the key being adapted to fit the polygonal opening in the bushing, to prevent relative rotation between the key and the bushing, relative rotation being permitted between the outer periphery of the bushing and the eye of the one-piece link, the key having diametrically opposed grooves extending transversely of its axis near its opposite ends to accommodate the walls adjacent the slots in the side members, to permit the key to shift lengthwise of the slots in the side members of the sectional link which lock the key against endwise displacement.

6. The combination in a sprocket chain comprising alternate one-piece links, and sectional links formed of side members, the one-piece links each having a circular eye; of a bushing rotatably and removably fitted in the eye of the one-piece link, and having a polygonal opening therethrough; the adjacent ends of the side members forming the next sectional link adapted to embrace the end of the one-piece link, and having registering openings formed therethrough, with which openings, the opening in the bushing is adapted to be alined; and a key or coupling insertible through the alined openings in the sectional link and in the bushing, the key having a peripheral protuberance to fit the polygonal opening in the bushing to prevent relative rotation between the key and the bushing, the one-piece link adapted to turn on the outer periphery of the bushing.

7. In a chain, the combination with a link having circular eyes formed near its opposite ends; a bushing removably and rotatably seated in each eye, the bushings each having a polygonal opening therethrough; sectional links each including a pair of side members, the ends of each pair of side members adapted to embrace the opposite ends of the first-named link, respectively, and provided with slots enlarged at one end with which the polygonal openings in the bushings register; keys insertible through the slots and the openings in the bushings, the cross-sectional area of the keys adapted to approximately conform to the area of the openings in their respective bushings; the keys adapted to slide along the slots in the side members; the ends of the side members being convex; and double-ended stops projecting laterally from the sides, and extending longitudinally of the first-named link, the opposite ends of the stops being recessed or concave to conform to and fit against the respective convex ends of the side members of the adjacent sectional link, to enable the links to assume various angles relatively to each other, and prevent accidental telescoping of the links.

8. In a chain, the combination with a solid link having circular eyes formed therethrough near its opposite ends; a bushing rotatably and removably fitted in each eye, and having an opening therethrough; sectional links, each including a pair of side members, the ends of which are slotted and are adapted to embrace the adjacent ends of the solid link; keys extending through the slots in the respective sectional links and through the openings in the respective bushings; means to prevent relative rotation between the keys and their associated side members, and bushings; the keys slidable along the slots in the side members; and double-ended abutments projecting laterally from the opposite sides of the solid link, the opposite ends of each abutment adapted to contact the ends of the respective side members connected to the opposite ends of the solid link to retain the pintles at the outer ends of the slots in the side members.

9. In a chain, the combination of solid and sectional links arranged alternately, the solid links each having a circular eye formed near each end thereof, bushings removably and rotatably seated in the eyes and having openings therethrough provided with keyways, the sectional links each comprising two side members, the ends of which are slotted, and adapted to embrace the ends of the adjacent solid links, the slots in the side members being enlarged at their inner ends to conform in shape to the shape of the openings in the bushings; coupling members comprising pins of a cross-sectional shape similar to the contour of the openings in the bushings and the enlarged portions of the slots, the couplings having splines extending longitudinally thereof to fit the keyways in the bushings, the couplings further provided with transversely extending opposed grooves to accommodate those portions of the side members adjacent the slots; and abutments projecting from the outer faces of the solid links into the planes of the side members of the respective sectional links connected to the opposite ends of each solid link.

SAMUEL V. TENCH.